United States Patent
Gao et al.

(10) Patent No.: US 10,701,613 B2
(45) Date of Patent: Jun. 30, 2020

(54) PATH SWITCHING METHOD AND APPARATUS BASED ON USER TEXT INFORMATION

(71) Applicant: ZTE CORPORATION, Shenzhen, Guangdong (CN)

(72) Inventors: Yin Gao, Shenzhen (CN); Shuang Liang, Shenzhen (CN); He Huang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/326,579

(22) PCT Filed: Aug. 18, 2017

(86) PCT No.: PCT/CN2017/098149
§ 371 (c)(1),
(2) Date: Feb. 19, 2019

(87) PCT Pub. No.: WO2018/033150
PCT Pub. Date: Feb. 22, 2018

(65) Prior Publication Data
US 2019/0246330 A1    Aug. 8, 2019

(30) Foreign Application Priority Data
Aug. 19, 2016  (CN) .......................... 2016 1 0695980

(51) Int. Cl.
*H04W 36/36*    (2009.01)
*H04W 36/00*    (2009.01)
(Continued)

(52) U.S. Cl.
CPC ...... *H04W 36/365* (2013.01); *H04W 36/0011* (2013.01); *H04W 36/0033* (2013.01);
(Continued)

(58) Field of Classification Search
CPC .......... H04W 36/365; H04W 36/0011; H04W 36/00; H04W 36/023
(Continued)

(56) References Cited

U.S. PATENT DOCUMENTS

2013/0260810 A1* 10/2013 Rayavarapu .......... H04W 76/19
                                                                 455/509
2015/0055621 A1    2/2015 Koskinen
(Continued)

OTHER PUBLICATIONS

3GPP TSG-SA WG3 Meeting#84-s3-160984, Jul. 29, 2016, Published 2016.*
(Continued)

*Primary Examiner* — Inder P Mehra
(74) *Attorney, Agent, or Firm* — Foley & Lardner LLP

(57) ABSTRACT

Disclosed is a path switching method and apparatus based on user text information, including that: (401) when a UE is switched into an inactive state on a source random access network (RAN) node and paging of the UE is initiated by the source RAN node, a target RAN node receives a resume request message sent by the UE, and sends a user text obtain request message to the source RAN node; (402) the target RAN node receives a user text obtain response message sent by the source RAN node, where the user text obtain response message carries user text information on the source RAN node; (403) after a data transmission channel is established between the source RAN node and the target RAN node according to information carried in the user text obtain request message, the target RAN node receives data cached locally and forwarded by the source RAN node.

19 Claims, 8 Drawing Sheets

(51) Int. Cl.
*H04W 76/27* (2018.01)
*H04W 36/02* (2009.01)
*H04W 68/02* (2009.01)

(52) U.S. Cl.
CPC .......... *H04W 68/02* (2013.01); *H04W 76/27* (2018.02); *H04W 36/023* (2013.01)

(58) Field of Classification Search
USPC ........................................................ 455/437
See application file for complete search history.

(56) References Cited

U.S. PATENT DOCUMENTS

| | | | |
|---|---|---|---|
| 2016/0286600 A1* | 9/2016 | Faccin | H04W 12/06 |
| 2016/0309379 A1* | 10/2016 | Pelletier | H04W 76/27 |
| 2016/0345261 A1* | 11/2016 | Walldeen | H04W 48/02 |
| 2019/0053324 A1* | 2/2019 | Tseng | H04W 76/30 |
| 2019/0158360 A1* | 5/2019 | Xu | H04W 92/20 |

OTHER PUBLICATIONS

PCT Written Opinion of the International searching Report, dated 2016.*
International Search Report and Written Opinion for International Appl. No. PCT/CN2017/098149, dated Sep. 27, 2017.

\* cited by examiner

PATH SWITCHING METHOD AND APPARATUS BASED ON USER TEXT INFORMATION

CROSS-REFERENCE TO RELATED APPLICATIONS

This is a National Stage Application, under 35 U.S.C. 371, of International Patent Application No. PCT/CN2017/098149, filed on Aug. 18, 2017, which claims priority to Chinese Patent Application No. 201610695980.0, filed on Aug. 19, 2016, contents of both of which are incorporated herein by reference in their entireties.

TECHNICAL FIELD

The present disclosure relates to, but is not limited to, the field of mobile communications and, in particular, relates to a path switching method and apparatus based on user text information.

BACKGROUND

In the long term evolution (LTE) system and in the research of the machine type communication (MTC) technology, for low-cost and low-throughput type user equipment, a research topic of the narrow band-Internet of Things (NB-IoT) is proposed, that is, a low-throughput wireless communication service is provided for NB-IoT low-cost user equipment (UE) in a frequency band of 200 kHz. A dedicated core network may be configured for users with the Narrow Band-Cellular Internet of Things (NB-CIOT) technology. An operator may manage these special-purpose UEs in the dedicated core network so as to distinguish them from ordinary users to minimize the impact on ordinary users. At the same time, the NB-IoT introduces different uplink narrowband access capabilities and optimized data transmission solutions for characteristics of the UE, i.e., low cost and small data amounts for transmission. The optimized data transmission solution includes optimization solutions based on user plane and control plane transmission. For smartphone users, the optimization solutions based on user plane and control plane transmission may also be extended.

In the optimization solution based on user plane transmission, similar to the LTE process, data is transmitted through a data radio bearer (DRB), and signaling is still transmitted through an SRB1/SRB2, where the SRB is a signaling radio bearer. The current standard has specified that only one DRB is configured for the NB-IoT user. Smartphone users that support the user plane solution may support multiple bearers. The network side introduces suspend and resume processes. The base station and the mobility management entity (MME) store user text information in the suspend process and may rapidly activate a user text in the resume process, and the suspend and resume of S1 interfaces are initiated by the base station. After the air interface suspend process is completed, the UE is switched to the idle state. When the UE needs to transmit data or "signaling+data" in the idle state, the UE may directly use the resume mechanism without performing the process of air interface encryption. The user text information includes the user identifier (ID) information, ID information related to the S1 interface user, information related to the user security, the bearer information, and information related to the service quality. The user historical information includes the historical information of the user in the connected state, and the historical information of the user which is reported by the UE and recently resided in the connected state and the idle state. When the user moves to the target base station in the suspend state, and when the target base station initiates the resume process, the target base station may obtain user text information from the source base station that stores the user text information through the X2 interface or the S1 interface. After the air interface resume process is completed, the UE is switched to the connected state. The radio access network (RAN) and the core network are aware of a state transition of the UE.

Meanwhile, with the continuous evolution of wireless communication technologies and protocol standards, the mobile packet traffic has been developed tremendously, and the data throughput capability of single UE has been continuously improved. In the LTE system, as an example, data transmission at a maximum downlink rate of 100 Mbps may be supported in a 20 M bandwidth. In the subsequent enhanced LTE system and the subsequent 5G system, the data transmission rate will be further increased, even up to tens of Gbps. The 5G technology features: seamless wide-area coverage, large-capacity hotspots, large number of connections with low power consumption, high reliability with low latency, and the like. One goal of the design for the next-generation RAN at the release 14 of the 3rd Generation Partnership Project (3GPP) is to use a single technology architecture to support multiple types of traffics, such as enhanced mobile broadband (eMBB), massive machine type communications (mMTC), ultra reliable and low latency communications (URLLC), and the like. In order to achieve the above goal, the design of the user plane architecture in the 5G New Radio (NR) needs to be flexible enough. In recent years, deployment of the centralized, cooperative, cloud & clean-radio access network (C-RAN) of the baseband Unit (BBU) and the radio remote unit (RRU) has been more and more widely used in many countries and regions around the world. In order to shield the underlying diversified access technology and support the traffic-oriented access, the 5G access network has a two-level network function architecture with the wireless center unit (CU) and the wireless distributed unit (DU) included, similar to the architecture of BBU+RRU in LTE. If the CU and the DU are deployed in the same network device, a distributed network architecture is provided, as shown in FIG. 1. If the CU and the DU are deployed in different network devices, a centralized network architecture is provided, as shown in FIG. 2. The CU satisfies the user-centered design concept, assumes the centralized control and management functions of the wireless network, and may serve as a service anchor for the UE. The DU is a remote access unit and includes a radio frequency function and a partial processing function. The interface between the CU and the DU may be called fronthaul, and the specific position division of the fronthaul (that is, the position at which the division is performed on the user plane) is currently being standardized. For simple description, the interface between the 5G RAN and the 5G CN is referred to as NG1 interface, and the interface between 5G RANs is referred to as NG2 interface.

In order to meet energy-saving requirements of the user and reduce the signaling interaction between the CN and the RAN, an inactive mode in the control of the RAN is considered to be introduced, the RAN side triggers the UE to enter this mode, and the UE may move in this mode without data transmission, and may process paging messages. When downlink data arrives at the base station or when the UE has uplink data to be transmitted, the UE may be triggered to initiate an air interface resume process and is switched to the connected state. The CN is unaware of the inactive state, in the control of the RAN, of the UE.

SUMMARY

The following is a summary of the subject matter described herein in detail. This summary is not intended to limit the scope of the claims.

Embodiments of the present disclosure provide a path switching method and apparatus based on user text information.

An embodiment of the present disclosure provides a path switching method based on user text information, including:
after a target base station receives a resume request message sent by a UE, sending, by the target base station, a user text obtain request message to a source base station directly or through a MME, where the user text obtain request message carries at least one of: a user text resume ID, a user text ID, or an MME ID;
receiving, by the target base station, a user text obtain response message sent by the source base station, where the user text obtain response message carries user text information found by the source base station according to information carried in the user text obtain request message; sending, by the target base station, a path switch request message for requesting user text resume to the MME; and
after the user text information is activated by the MME according to the path switch request message for requesting user text resume, receiving, by the target base station, a path request response message sent by the MME, to complete the user text resume.

Another embodiment of the present disclosure provides a path switching method based on user text information, including:
receiving, by a RAN node, a resume request message sent by a UE, and sending a user text obtain request message to a source RAN node;
receiving, by the target RAN node, a user text obtain response message sent by the source RAN node, wherein the user text obtain response message carries user text information on the source RAN node; and
after a data transmission channel is established between the source RAN node and the target RAN node according to information carried in the user text obtain request message, receiving, by the target RAN node, data cached locally and forwarded by the source RAN node.

An embodiment of the present disclosure provides a path switching apparatus based on user text information, including:
a first receiving unit, which is configured to receive a resume request message sent by a UE;
a first sending unit, which is configured to send a user text obtain request message to a source base station directly or through a MME, where the user text obtain request message carries at least one of: a user text resume ID, a user text ID, or an MME ID;
a second receiving unit, which is configured to receive a user text obtain response message sent by the source base station, where the user text obtain response message carries user text information found by the source base station according to information carried in the user text obtain request message;
a second sending unit, which is configured to send a path switch request message for requesting user text resume to the MME; and
a third receiving unit, which is configured to receive a path request response message sent by the MME to complete the user text resume after the user text information is activated by the MME according to the path switch request message for requesting user text resume.

Another embodiment of the present disclosure provides a path switching apparatus based on user text information, including:
a first receiving unit, which is configured to receive a resume request message sent by a UE;
a first sending unit, which is configured to send a user text obtain request message to a source RAN node;
a second receiving unit, which is configured to receive a user text obtain response message sent by the source RAN node, where the user text obtain response message carries user text information on the source RAN node; and
a third receiving unit, which is configured to receive data cached locally and forwarded by the source RAN node after a data transmission channel is established between the source RAN node and a target RAN node according to information carried in the user text obtain request message.

In the embodiments of the present disclosure and in the UP solution for the NB-IoT user in the LTE system, the process of obtaining the UE user text includes the steps described below. After a target base station receives a resume request message sent by a UE, the target base station sends a user text obtain request message to a source base station directly or through a MME, where the user text obtain request message carries at least one of: a user text resume identifier (ID), a user text ID, or an MME ID. The target base station receives a user text obtain response message sent by the source base station, where the user text obtain response message carries user text information found by the source base station according to information carried in the user text obtain request message. The target base station sends a path switch request message for requesting user text resume to the MME; and after the user text information is activated by the MME according to the path switch request message for requesting user text resume, the target base station receives a path request response message sent by the MME, to complete the user text resume. In the user solution that supports an inactive state in the control of a RAN in the 5G system, the process of obtaining the UE user text includes the steps described below. When the UE is switched into the inactive state on the source RAN node and paging of the UE is initiated by the source RAN node, the target RAN node receives the resume request message sent by the UE, and sends the user text obtain request message to the source RAN node. The target RAN node receives a user text obtain response message sent by the source RAN node, where the user text obtain response message carries user text information on the source RAN node. After a data transmission channel is established between the source RAN node and the target RAN node according to information carried in the user text obtain request message, the target RAN node receives data cached locally and forwarded by the source RAN node. The path switching method based on user text information provided by the embodiments of the present disclosure may achieve user text information obtaining across RAN nodes in the scenario where the UE is moving across the RAN nodes, and achieve forwarding of cache data on the RAN node, to avoid the user resume failure and the defect of cache data forwarding failure due to movement of the user. The present disclosure can satisfy user text information obtaining and data forwarding in the user text resume process for NB-IoT users in the LTE system, smartphone users that support the user plane solution and users that support the inactive state in the control of the RAN side in the 5G system.

The network efficiency is therefore improved.

Other aspects can be understood after the drawings and detailed description are read and understood.

DETAILED DESCRIPTION

Implementation of the embodiments of the present disclosure is described below in detail with reference to the drawings. The drawings are provided for reference only and are not intended to limit the embodiments of the present disclosure.

In the NB-IoT technology, if a cross-base station resume process is performed on a UE, a target base station obtains user text information from a source base station via an X2 interface. The user text information cannot be obtained to complete the resume process when the X2 interface does not exist. At the same time, in the NB-IoT, the user is only in the connected state or the idle state and the core network is aware of a change of the user state, so there is not a case where data arrives at the source base station after the user is the suspend state. The 5G system is different. The user has an inactive state in the control of the network side and the core network is unaware of a change of the user state, so there is a case where data arrives at the source base station after the user is in the suspend state. In view of the above scenarios, how to obtain the user text information from a source RAN device via the S1 interface and forward downlink arrival data cached by the source RAN device to a target RAN device in the mobile communication system needs to be solved currently.

Figure 1:
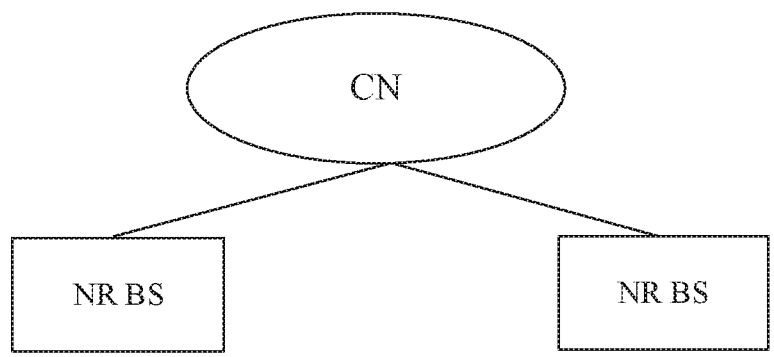
FIG. 1 is an architecture diagram of a 5G distributed network.
Figure 2:
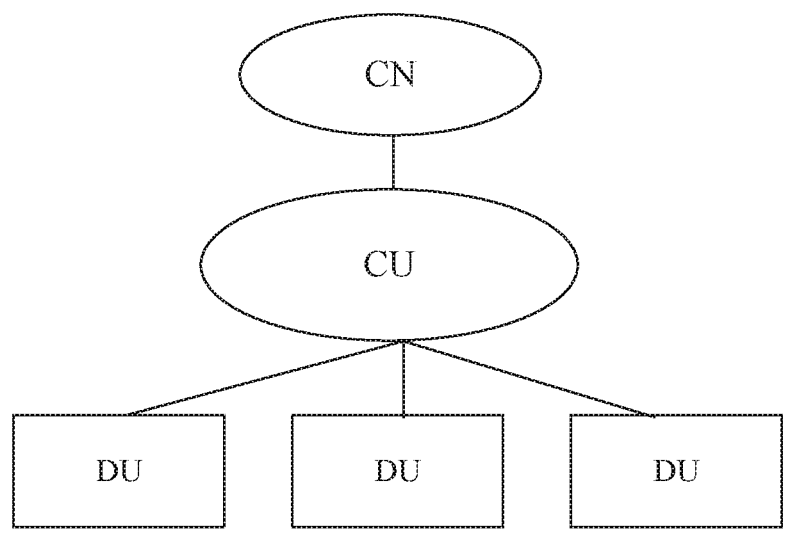
FIG. 2 is an architecture diagram of the 5G centralized network.
Figure 3:
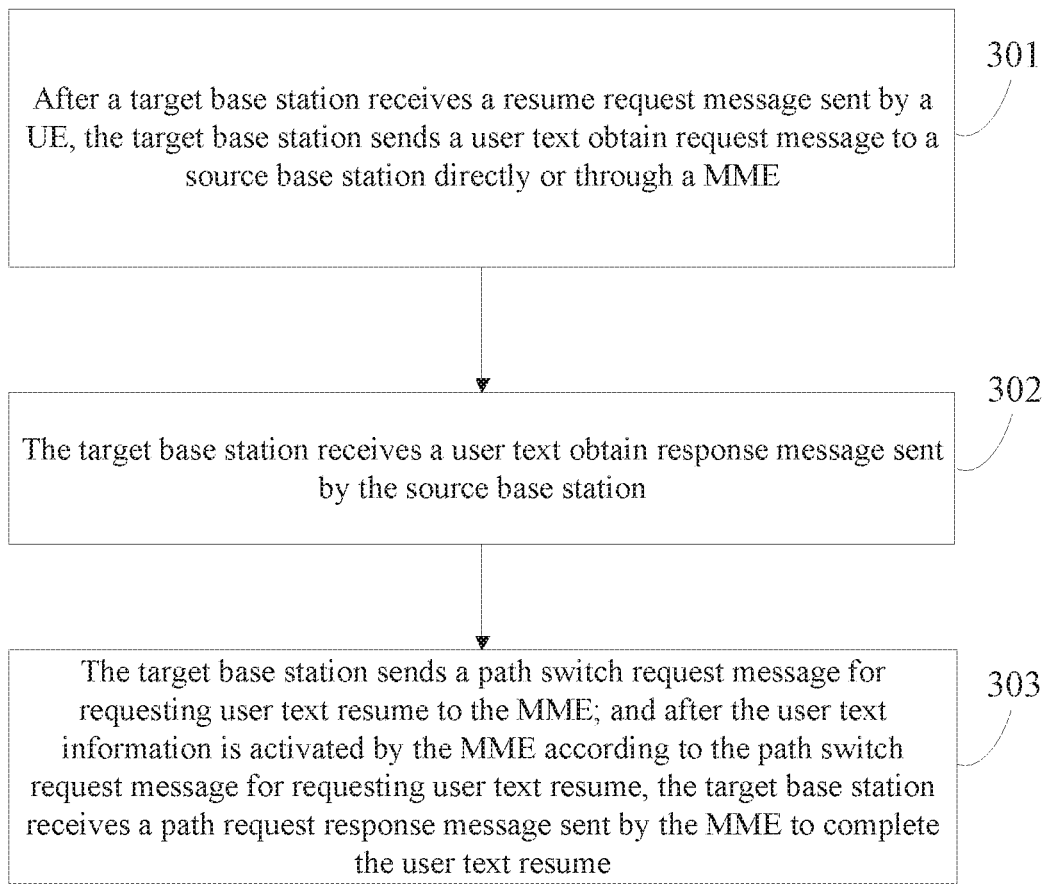
FIG. 3 is a flowchart 1 of a path switching method based on user text information according to an embodiment of the present disclosure.

FIG. 3 is a flowchart 1 of a path switching method based on user text information according to an embodiment of the present disclosure. The example is applied to the UP solution for NB-IoT users in the LTE system. As shown in FIG. 3, the path switching method based on user text information includes steps described below.

In a step 301, after a target base station receives a resume request message sent by a UE, the target base station sends a user text obtain request message to a source base station directly or through a MME. The user text obtain request message carries at least one of: a user text resume ID, a user text ID, or an MME ID.

In the embodiment of the present disclosure, the user text ID includes an ID that uniquely identifies a user text at the MME.

The MME ID includes an ID of a source MME serving the UE.

In an embodiment, after the target base station receives the resume request message sent by the UE through an air interface, the target base station needs to carry, in addition to the user text resume ID, at least one of the ID that can uniquely identify the user text at the MME or the ID of the source MME serving the UE, for the core network to locally identify the user text or to obtain user text information across MMEs, and to match a route to the source base station based on the user text information at the core network. For example, the source base station is routed to through unique association ID information of the S1 interface between the source base station and the source MME associated with the UE. The core network is used to obtain the user text information so that the target base station may still achieve message routing and user text information obtaining via the S1 interface in response to the case where no X2 interface exists. In an embodiment, when no X2 interface exists between the target base station and the source base station, the target base station needs to deliver the information to a target MME.

In the embodiment of the present disclosure, the target base station sends the user text obtain request message to the source base station through the MME via the S1 interface, or sends the user text obtain request message to the source base station directly via the X2 interface.

In a step 302, the target base station receives a user text obtain response message sent by the source base station. The user text obtain response message carries user text information found by the source base station according to information carried in the user text obtain request message.

In the embodiment of the present disclosure, the step in which the target base station receives the user text obtain response message sent by the source base station includes a step described below.

The target base station receives, through the MME via the S1 interface, the user text obtain response message sent by the source base station, or receives, directly via the X2 interface, the user text obtain response message sent by the source base station.

In the embodiment of the present disclosure, the step in which the target base station receives, through the MME via the S1 interface, the user text obtain response message sent by the source base station includes steps described below.

When no X2 interface exists between the target base station and the source base station, the target base station matches a route to the source base station via the S1 interface.

The target base station receives, via the route to the source base station, the user text information sent by the source base station through the MME.

In an embodiment, the source base station locally identifies the text information of the UE according to the resume ID in the user text obtain request message, and delivers the locally found user text information to the target base station through the user text information obtain response message. The user text information obtain response message may be sent to the target base station through the MME via the S1 interface or directly via the X2 interface.

In a step 303, the target base station sends a path switch request message for requesting user text resume to the MME; and after the user text information is activated by the MME according to the path switch request message for requesting user text resume, the target base station receives a path request response message sent by the MME to complete the user text resume.

In the embodiment of the present disclosure, the target base station sends the path switch request message for requesting user text resume to the MME.

After the user text information is activated by the MME according to the path switch request message for requesting user text resume, the target base station receives the path request response message sent by the MME to complete the user text resume.

Figure 4:
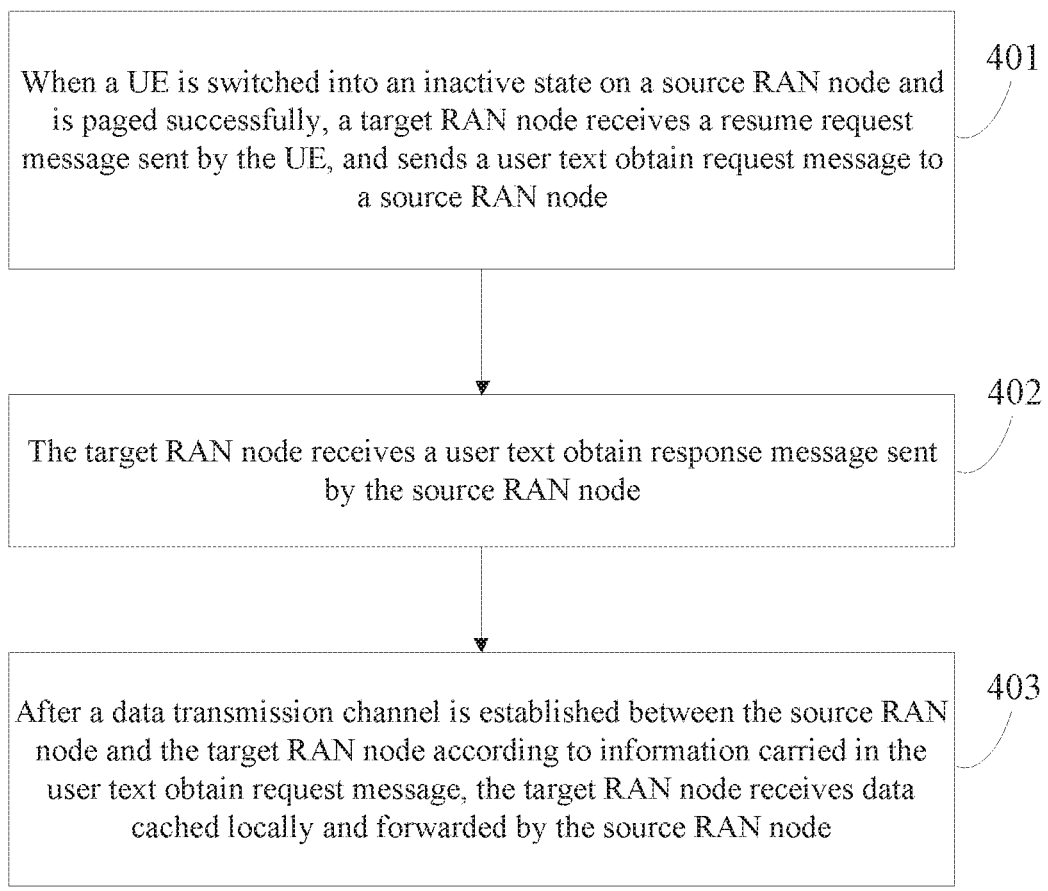
FIG. 4 is a flowchart 2 of a path switching method based on user text information according to an embodiment of the present disclosure.

FIG. 4 is a flowchart 2 of a path switching method based on user text information according to an embodiment of the present disclosure. The example is applied to a user that supports an inactive state in the control of a RAN in the 5G system. As shown in FIG. 4, the path switching method based on user text information includes steps described below.

In a step 401, when the UE is switched into an inactive state on the source RAN node and is paged successfully, the target RAN node receives the resume request message sent by the UE, and sends a user text obtain request message to the source RAN node.

In the embodiment of the present disclosure, when the UE is switched into the inactive state, the UE is still in the connected state for the core network. When downlink data arrives at the source RAN node, the source RAN node initiates paging of the UE so that the UE triggers a resume request to the target RAN node.

In the embodiment of the present disclosure, the paging of the UE includes that the source RAN node initiates the paging of the UE within a location area of the source RAN node.

In the embodiment of the present disclosure, the target RAN node sends the user text obtain request message to the source RAN node includes that the target RAN node sends the user text obtain request message to the source RAN node via a direct interface to the source RAN node. The direct interface between the RAN nodes may be an NG2 interface.

In the embodiment of the present disclosure, when the UE is switched into the inactive state, the UE is still in the connected state for the core network.

In the embodiment of the present disclosure, the step in which the target RAN node sends the user text obtain request message to the source RAN node includes a step described below.

The target RAN node sends the user text obtain request message to the source RAN node via the direct interface to the source RAN node.

In the embodiment of the present disclosure, the resume request message includes at least one of: a user text resume ID, a user text ID or an ID of a source core network node serving the UE.

The user text resume ID is used for uniquely identifying user text information in the source RAN node.

The user text ID is used for uniquely identifying a user text at a core network.

The ID of a source core network node serving the UE is used for obtaining the user text across core network nodes.

In the embodiment of the present disclosure, when no direct interface exists between the target RAN node and the source RAN node, a route to the source RAN node is matched based on user text information found by a core network.

In an embodiment, downlink data arrives at the source RAN node, the source RAN node initiates paging of the UE, such as initiating a paging message within a location area of the RAN side, and the paging message may be forwarded within the same RAN location area via the NG2 interface. After the UE receives the paging message, the UE triggers the air interface to initiate a resume request to the target RAN node. The request message includes at least one of: the user text resume ID, or at least one of the ID information that can uniquely identify the user text at the core network or the ID information of the source core network node serving the UE.

The user text resume ID is used for uniquely identifying user text information in the source RAN node.

At least one of the ID information that can uniquely identify the user text at the core network or the ID information of the source core network node serving the UE, is used by the core network for locally identifying the user text or is used for obtaining the user text across core network nodes, and is used for matching a route to the source RAN node based on user text information at the core network. For example, the source RAN node is routed to through unique user association ID information of the NG1 interface between the source RAN node and the old core network node associated with the UE. In an embodiment, when no NG2 interface exists between the target RAN node and the source RAN node, the target RAN node needs to deliver the information to a new core network.

In the embodiment of the present disclosure, the user text obtain request message includes at least one of:
a user text resume ID;
relevant information about the source RAN node; or
data forwarding address information of the target RAN node.

The data forwarding address information includes: address information related to a bearer, or address information related to an Internet Protocol (IP) flow.

In a step 402, the target RAN node receives a user text obtain response message sent by the source RAN node. The user text obtain response message carries user text information on the source RAN node.

In a step 403, after a data transmission channel is established between the source RAN node and the target RAN node according to information carried in the user text obtain request message, the target RAN node receives data cached locally and forwarded by the source RAN node.

In the embodiment of the present disclosure, after the data transmission channel is established between the source RAN node and the target RAN node according to the data forwarding address information of the target RAN node, the target RAN node receives the data cached locally and forwarded by the source RAN node. For example, downlink arrival data cached on the source RAN node is forwarded to the target RAN node.

Finally, the target RAN node initiates a path update process to the core network via the NG1 interface.

For the above solution, the RAN node in the 5G system is referred to as the 5G base station in the distributed architecture, is referred to as the CU or an aggregation node on the RAN side in the centralized architecture. The embodiment of the present disclosure is applicable to, but not limited to, 5G, eLTE, and LTE systems.

Figure 5:
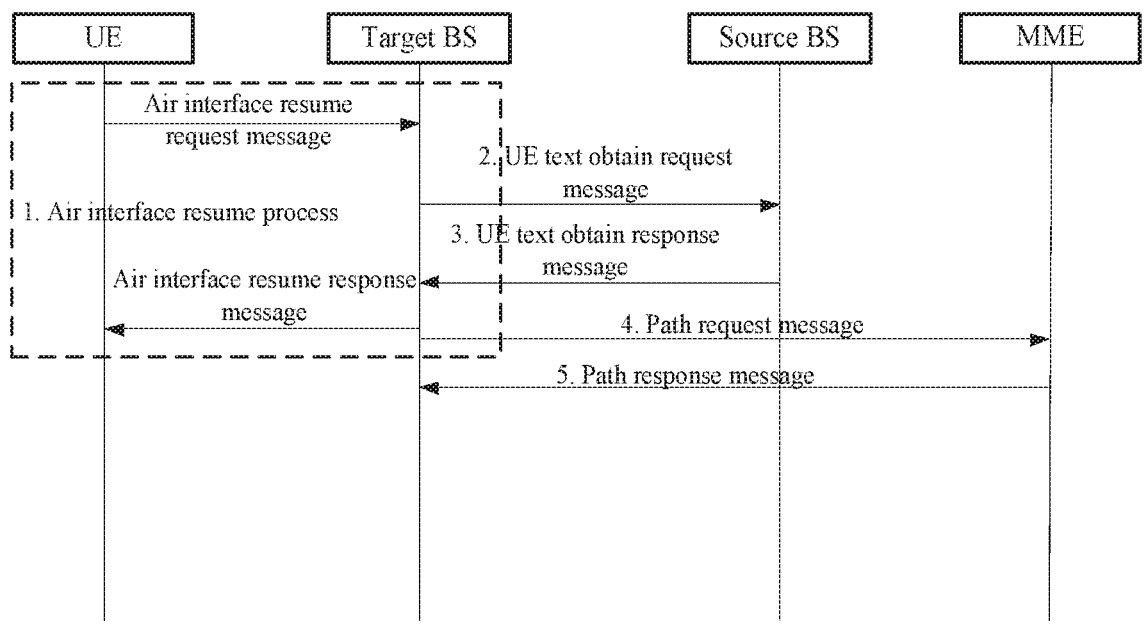
FIG. 5 is a schematic diagram of obtaining and resume of user text information across base stations in an LTE system.

Referring to FIG. 5, a schematic diagram of a process of obtaining and resume of user text information across base stations for users that support the UP solution in the LTE system is shown. The UE may move from a source base station to a target base station in a suspend state, and initiates a resume request at the target base station. After the target base station receives the resume request from the UE, the target base station sends a user text obtain request according to information carried in the air interface request message. The request message carries a resume ID that is used for uniquely identifying the user text. This ID is comprised of source base station identification information and UE identification information, is allocated by the source base station and is notified to the UE when the UE is in the suspend state. If the source base station finds the text information of the UE locally, the source base station feeds back the text information of the UE to the target base station in a text obtain response message. If the source base station does not find the text information of the UE locally, the source base station sends a text obtain failure message to the target base station. After the target base station obtains the text information of the UE, the target base station implements bearer path information update and user text resume through the path request process.

The embodiments in the present disclosure are described below in detail in conjunction with specific application scenarios.

Figure 6:
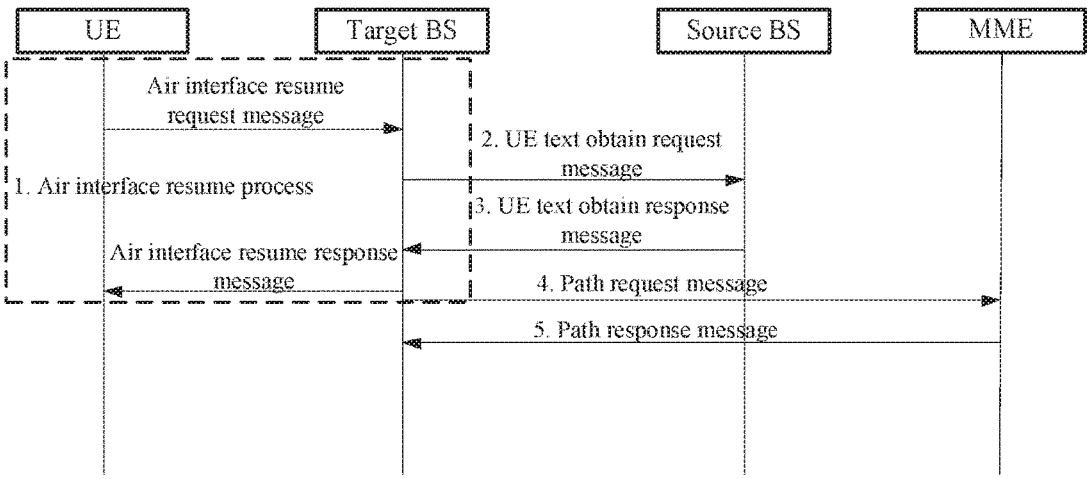
FIG. 6 is a flowchart of an embodiment 1 of an LTE system according to an embodiment of the present disclosure.

Referring to FIG. 6, the path switching method based on user text information includes the steps described below.

1) After the target base station receives the resume request message sent by the UE through an air interface, the target base station needs to carry, in addition to the user text resume ID, at least one of the ID (such as globally unique temporary UE identity (GUTI), or globally unique mobility management entity identifier (GUMMEI) and SAE temporary mobile subscriber identity (S-TMSI)) that can uniquely identify the user text at the MME or the ID of the source MME serving the UE, for the core network to locally identify the user text or to obtain user text information across MMEs, and to match a route to the source base station based on the user text information at the core network. For example, the source base station is routed to through unique association ID information of the S1 interface between the source base station and the source MME associated with the UE.

2) The target base station sends user text obtain request message to the source base station through the MME via the S1 interface or directly via the X2 interface.

3) The source base station locally identifies the text information of the UE according to the resume ID in the user text obtain request message, and delivers the locally found user text information to the target base station through the user text information obtain response message. The user text information obtain response message may be sent to the target base station through the MME via the S1 interface or directly via the X2 interface.

4) The base station sends a path switch request message to the MME to complete user text resume.

5) After the user text is activated by the MME, the MME sends a path request response message to the target base station to complete the text resume.

Figure 7:
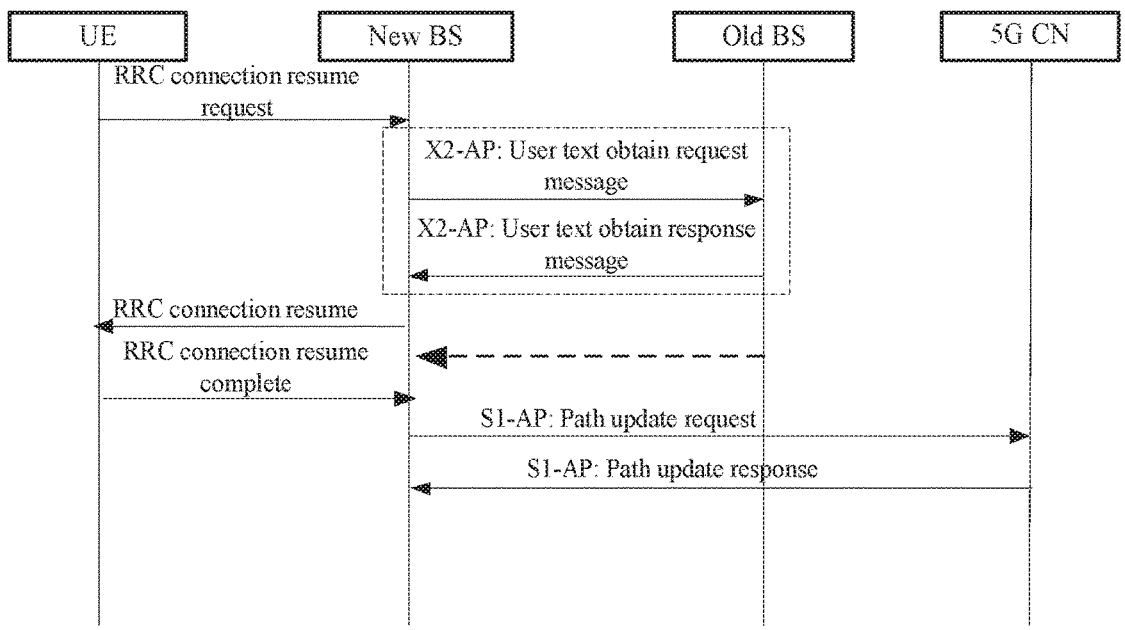
FIG. 7 is a flowchart of an embodiment 2 of a 5G system according to an embodiment of the present disclosure.

Referring to FIG. 7, the example is about the distributed architecture. The path switching method based on user text information includes the steps described below.

1) The UE is switched into the inactive state at an old base station (BS). This state is transparent to the core network (CN), that is, the UE is still in the connected state for the CN.

2) Downlink data arrives at the old base station, the old base station initiates paging of the UE, such as initiating a paging message within a location area of the RAN side, and the paging message may be forwarded within the same RAN location area via the NG2 interface.

3) After the UE receives the paging message, the UE triggers the air interface to initiate a resume request to a new BS. The request message includes at least one of: a resume request type, the user text resume ID, or at least one of the ID information that can uniquely identify the user text at the core network or the ID information of the source core network node serving the UE.

The resume request type indicates traffic setup or downlink data arrival.

The user text resume ID is used for uniquely identifying user text information in the source RAN node.

At least one of the ID information that can uniquely identify the user text at the core network or the ID information of the source core network node serving the UE, is used by the core network for locally identifying the user text or is used for obtaining the user text across core network nodes, and is used for matching a route to the old BS based on user text information at the core network. For example, the old BS is routed to through unique user association ID information of the NG1 interface between the old BS and the old core network node associated with the UE.

4) The new BS initiates the user text obtain request message to the old BS via the NG2 interface. The message includes at least one of:

a user text resume ID;

relevant information about the old BS; or data forwarding address information of the new BS, where the address may be related to a bearer, or related to an IP flow. A data transmission channel is established between the old BS and the new BS and data is forwarded based on the address information. For example, the downlink arrival data cached on the old BS is forwarded to the new BS.

5) The old BS sends a user text obtain response message to the new BS. The message includes user text information saved on the old BS by the user.

6) The data transmission channel is established between the old BS and the new BS according to the data forwarding address obtained in the step 4), and the old BS forwards the locally cached data to the new BS.

7) The new BS initiates a path update process to the core network via the NG1 interface.

Figure 8:
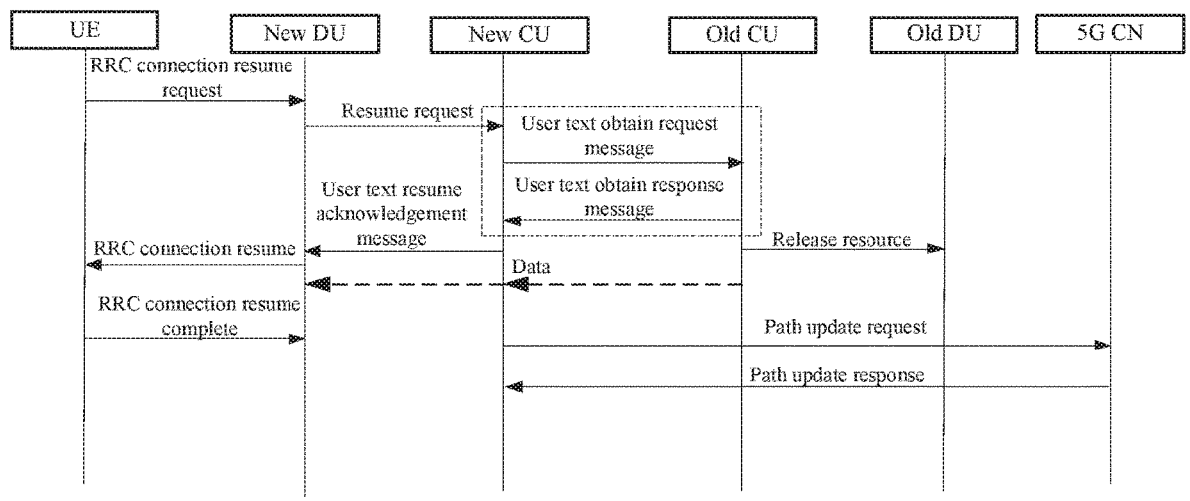
FIG. 8 is a flowchart of an embodiment 3 of a 5G system according to an embodiment of the present disclosure.

Referring to FIG. 8, the example is about the centralized architecture, and downlink data arrives at and is cached in the CU. The CU and the DU are assumed to be separated, the NG2 interface exists between the CUs, the CU is connected to the 5G CN via the NG1 interface, and the CU is connected to the DU via an NG3 interface. The location area of the RAN side is managed by the CU. The downlink data is cached in the CU or between the CUs, or a data transmission channel may be established between the CU and the DU. The path switching method based on user text information includes the steps described below.

1) The UE is switched into the inactive state in the old CU. This state is transparent to the CN, that is, the UE is still in the connected state for the CN.

2) Downlink data arrives at the old CU, the old CU delivers a paging message of the UE through the DU, such as initiating the paging message within a location area of the RAN side, and the paging message may be forwarded within the same RAN location area via the NG2 interface.

3) After the UE receives the paging message, the UE triggers the air interface to initiates a resume request to the new DU. The request message includes at least one of: a resume request type, a user text resume ID, or at least one of the ID information that can uniquely identify the user text at the core network or the ID information of the source core network node serving the UE.

The resume request type indicates traffic setup or downlink data arrival.

The user text resume ID is used for uniquely identifying user text information in the source CU.

At least one of the ID information that can uniquely identify the user text at the core network or the ID information of the source core network node serving the UE, is used by the core network for locally identifying the user text or is used for obtaining the user text across core network nodes, and is used for matching a route to the old CU based on user text information at the core network. For example, the old CU is routed to through unique user association ID information of the NG1 interface between the old CU and the old core network node associated with the UE.

4) The new DU sends the resume request reported by the UE to the new CU.

5) The new CU initiates the user text obtain request message to the old CU via the NG2 interface. The message includes at least one of:

a user text resume ID;

data forwarding address information of the new CU or the new DU, where the address may be related to a bearer, or related to an IP flow. A data transmission channel is established between the old CU and the new CU and data is forwarded based on the address information. For example, the downlink arrival data cached on the old CU is forwarded to the new CU or the new DU.

6) The old CU sends a user text obtain response message to the new CU. The message includes user text information saved on the old CU by the user.

7) The old CU deletes local user text information and resources, and notifies the old DU to release resources related to the user.

8) The new CU returns a user text resume acknowledgement message to the new DU.

9) The data transmission channel is established by the old CU according to the data forwarding address obtained in the step 5), and the old CU forwards the locally cached data to the new CU or the new DU.

10) The new CU initiates a path update process to the core network via the NG1 interface.

Figure 9:
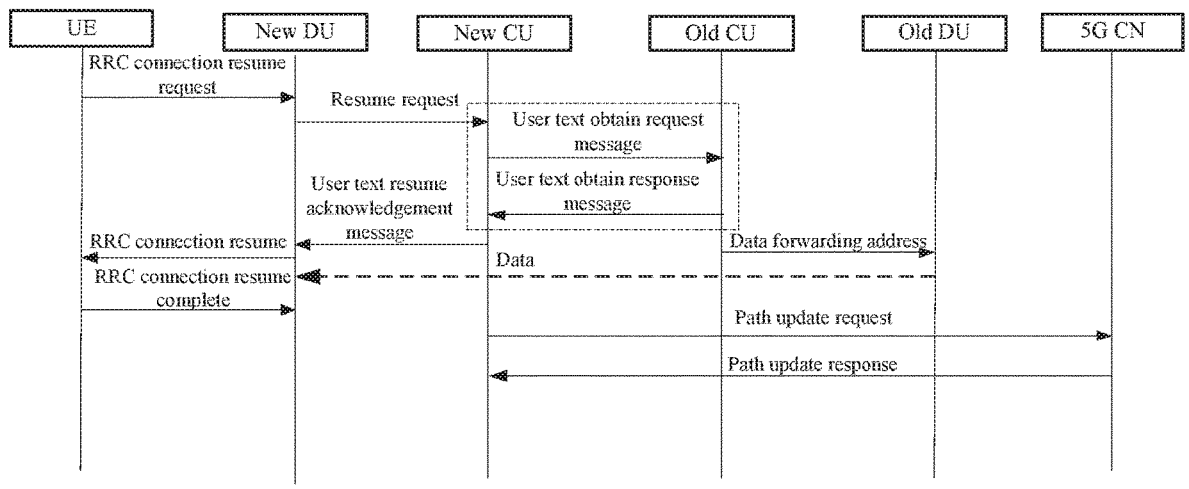
FIG. 9 is a flowchart of an embodiment 4 of a 5G system according to an embodiment of the present disclosure.

Referring to FIG. 9, the example is about the centralized architecture, and downlink data arrives at and is cached in the CU. The CU and the DU are assumed to be separated, the NG2 interface exists between the CUs, the CU is connected to the 5G CN via the NG1 interface, and the CU is connected to the DU via an NG3 interface. The location area of the RAN side is managed by the CU. The downlink data arrives at and is cached in the DU or between the DUs, or a data transmission channel may be established between the CU and the DU. The path switching method based on user text information includes the steps described below.

1) The UE is switched into the inactive state in the old CU. This state is transparent to the CN, that is, the UE is still in the connected state for the CN.

2) Downlink data arrives at the old DU, the old CU delivers a paging message of the UE through the DU, such as initiating the paging message within a location area of the RAN side, and the paging message may be forwarded within the same RAN location area via the NG2 interface.

3) After the UE receives the paging message, the UE triggers the air interface to initiates a resume request to the new DU. The request message includes at least one of: a resume request type, a user text resume ID, or at least one of the ID information that can uniquely identify the user text at the core network or the ID information of the source core network node serving the UE.

The resume request type indicates traffic setup or downlink data arrival.

The user text resume ID is used for uniquely identifying user text information in the source CU.

At least one of the ID information that can uniquely identify the user text at the core network or the ID information of the source core network node serving the UE, is used by the core network for locally identifying the user text or is used for obtaining the user text across core network nodes, and is used for matching a route to the old CU based on user text information at the core network. For example, the old CU is routed to through unique user association ID information of the NG1 interface between the old CU and the old core network node associated with the UE.

4) The new DU sends the resume request reported by the UE to the new CU.

5) The new CU initiates the user text obtain request message to the old CU via the NG2 interface. The message includes at least one of:

a user text resume ID;

data forwarding address information of the new DU, where the address may be related to a bearer, or related to an IP flow, and a data transmission channel is established between the old DU and the new DU and data is forwarded based on the address information, for example, the downlink arrival data cached on the old DU is forwarded to the new DU.

6) The new CU sends the data forwarding address information of the new DU to the old DU. The data transmission channel is established between the old DU and the new DU according to the obtained data forwarding address, and the old DU forwards locally cached data to the new DU, and may release resources related to the user at the same time.

7) The old CU sends a user text obtain response message to the new CU. The message includes user text information saved on the old CU by the user. Moreover, information and resources related to the local user are released.

8) The new CU initiates a path update process to the core network via the NG1 interface.

Figure 10:
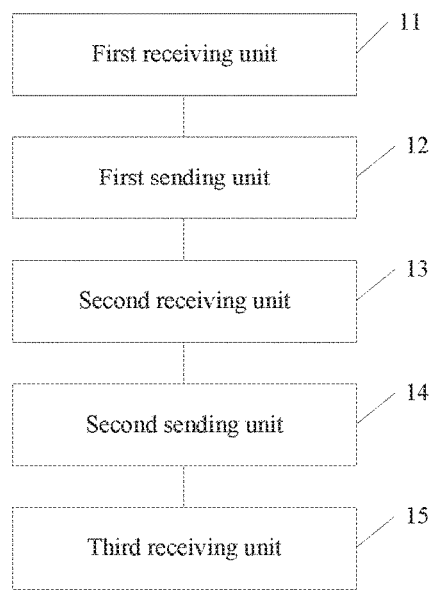
FIG. 10 is a structural diagram 1 of a path switching apparatus based on user text information according to an embodiment of the present disclosure.

FIG. 10 is a structural diagram 1 of a path switching apparatus based on user text information according to an embodiment of the present disclosure. The apparatus includes: a first receiving unit 11, a first sending unit 12, a second receiving unit 13, a second sending unit 14, and a third receiving unit 15.

The first receiving unit 11 is configured to receive a resume request message sent by a UE.

The first sending unit 12 is configured to send a user text obtain request message to a source base station directly or through a MME. The user text obtain request message carries at least one of: a user text resume ID, a user text ID, or an MME ID.

The second receiving unit 13 is configured to receive a user text obtain response message sent by the source base station. The user text obtain response message carries user text information found by the source base station according to information carried in the user text obtain request message. The second sending unit 14 is configured to send a path switch request message for requesting user text resume to the MME.

The third receiving unit 15 is configured to receive a path request response message sent by the MME to complete the user text resume after the user text information is activated by the MME according to the path switch request message for requesting user text resume.

In the embodiment of the present disclosure, the user text ID includes an ID that uniquely identifies a user text at the MME.

The MME ID includes an ID of a source MME serving the UE.

In the embodiment of the present disclosure, the first sending unit 12 is further configured to send the user text obtain request message to the source base station through the MME via an S1 interface, or send the user text obtain request message to the source base station directly via an X2 interface.

In the embodiment of the present disclosure, the second receiving unit 13 is further configured to receive, through the MME via the S1 interface, the user text obtain response message sent by the source base station, or receive, directly via the X2 interface, the user text obtain response message sent by the source base station.

In the embodiment of the present disclosure, the second receiving unit 13 is further configured to: match a route to the source base station via the S1 interface when no X2 interface exists between the target base station and the source base station; and receive user text information sent through the MME by the source base station based on the route to the source base station.

In practical applications, the path switching apparatus based on user text information shown in FIG. 10 may be configured in a base station. The base station includes a processor and a memory storing the processor-executable instructions. When the instructions are executed by the processor, the processor performs the operations described below.

After a resume request message sent by a UE is received, a user text obtain request message is sent to a source base station directly or through a MME, where the user text obtain request message carries at least one of: a user text resume identifier (ID), a user text ID, or an MME ID. A user text obtain response message sent by the source base station is received, where the user text obtain response message carries user text information found by the source base station according to information carried in the user text obtain request message. A path switch request message for requesting user text resume is sent to the MME; and after the user text information is activated by the MME according to the path switch request message for requesting user text resume, a path request response message sent by the MME is received to complete the user text resume.

In an embodiment, the user text ID includes an ID that uniquely identifies a user text at the MME. The MME ID includes an ID of a source MME serving the UE.

In an embodiment, the processor performs the operations described below. The user text obtain request message is sent to the source base station through the MME via an S1 interface, or the user text obtain request message is sent to the source base station directly via an X2 interface.

In an embodiment, the processor performs the operations described below. The user text obtain response message sent by the source base station is received through the MME via the S1 interface, or the user text obtain response message sent by the source base station is received directly via an X2 interface. A route to the source base station is matched via the S1 interface when no X2 interface exists between the target base station and the source base station; and user text information sent through the MME by the source base station is received based on the route to the source base station.

Figure 11:
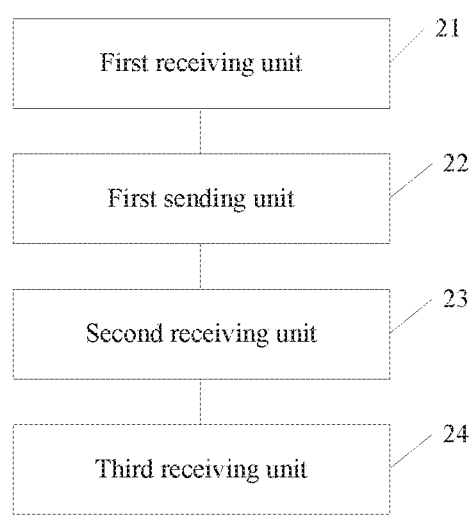
FIG. 11 is a structural diagram 2 of a path switching apparatus based on user text information according to an embodiment of the present disclosure.

FIG. 11 is a structural diagram 2 of a path switching apparatus based on user text information according to an embodiment of the present disclosure. The apparatus includes: a first receiving unit 21, a first sending unit 22, a second receiving unit 23, and a third receiving unit 24.

The first receiving unit 21 is configured for a target RAN node to receive a resume request message sent by a UE when the UE is switched into an inactive state on a source RAN node and is paged by the source RAN node.

The first sending unit 22 is configured to send a user text obtain request message to the source RAN node.

The second receiving unit 23 is configured to receive a user text obtain response message sent by the source RAN node. The user text obtain response message carries user text information on the source RAN node.

The third receiving unit 24 is configured to receive data cached locally and forwarded by the source RAN node after a data transmission channel is established between the source RAN node and a target RAN node according to information carried in the user text obtain request message.

In the embodiment of the present disclosure, the first sending unit 22 is further configured to send the user text obtain request message to the source RAN node via a direct interface to the source RAN node.

In the embodiment of the present disclosure, the first receiving unit 21 is further configured to receive the resume request message sent by the UE when the UE is switched into the inactive state on the source RAN node and is paged successfully.

In the embodiment of the present disclosure, when the UE is switched into the inactive state, the UE is still in the connected state for the core network.

In the embodiment of the present disclosure, the paging of the UE includes that the source RAN node initiates the paging of the UE within a location area of the source RAN node.

In the embodiment of the present disclosure, the first sending unit 22 is further configured to send the user text obtain request message to the source RAN node via a direct interface to the source RAN node.

In the embodiment of the present disclosure, the resume request message includes at least one of: a user text resume ID, a user text ID or an ID of a source core network node serving the UE.

The user text resume ID is used for uniquely identifying user text information in the source RAN node.

The user text ID is used for uniquely identifying a user text in a core network.

The ID of a source core network node serving the UE is used for obtaining the user text across core network nodes.

In the embodiment of the present disclosure, when no direct interface exists between the target RAN node and the source RAN node, a route to the source RAN node is matched based on user text information found by a core network.

In the embodiment of the present disclosure, the user text obtain request message includes at least one of:
a user text resume ID;
relevant information about the source RAN node; or
data forwarding address information of the target RAN node.

In the embodiment of the present disclosure, the data forwarding address information includes: address information related to a bearer, or address information related to an IP flow.

The third receiving unit 24 is further configured to receive the data cached locally and forwarded by the source RAN node after the data transmission channel is established between the source RAN node and the target RAN node according to the data forwarding address information of the target RAN node.

In practical applications, the path switching apparatus based on user text information shown in FIG. 11 may be configured in a RAN node. The RAN node includes a processor and a memory storing the processor-executable instructions. When the instructions are executed by the processor, the processor performs the operations described below.

When the UE is switched into the inactive state on the source RAN node and is paged by the source RAN node, the resume request message sent by the UE is received, and the user text obtain request message is sent to the source RAN node; and the user text obtain response message sent by the source RAN node is received. The user text obtain response message carries user text information on the source RAN node.

In an embodiment, the processor performs the operations described below. The user text obtain request message is sent to the source RAN node via the NG2 interface.

In an embodiment the resume request message includes at least one of: a user text resume ID, a user text ID or an ID of a source core network node serving the UE.

The user text resume ID is used for uniquely identifying user text information in the source RAN node.

The user text ID is used for uniquely identifying a user text in a core network.

The ID of a source core network node serving the UE is used for obtaining the user text across core network nodes.

In an embodiment, when no NG2 interface exists between the target RAN node and the source RAN node, the target RAN node matches the route to the source RAN node via the NG1 interface. The target RAN node receives the user text information sent through the core network by the source RAN node based on the route to source RAN node.

In an embodiment, the user text obtain request message includes at least one of:
a user text resume ID;
relevant information about the source RAN node; or
data forwarding address information of the target RAN node.

In an embodiment, the data forwarding address information includes: address information related to a bearer, or address information related to an IP flow.

It should be understood by those skilled in the art that functional modules/units in all or part of the steps of the method, the system and the apparatus disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage media, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, communication media generally include computer-readable instructions, data structures, program modules, or other data in modulated data signals such as carriers or other transmission mechanisms, and may include any information delivery media.

The above are only optional embodiments of the present disclosure and are not intended to limit the scope of the present disclosure.

INDUSTRIAL APPLICABILITY

The embodiments of the present disclosure may achieve user text information obtaining across RAN nodes in the scenario where the UE is moving across the RAN nodes, and achieve forwarding of cache data on the RAN node, to avoid user resume failure and a defect of cache data forwarding failure due to movement or the user. The present disclosure can satisfy user text information obtaining and data forwarding in the user text resume process for NB-IoT users in the LTE system, smartphone users that support the user plane solution and users that support the inactive state in the control of the RAN side in the 5G system. The network efficiency is thus improved.

What is claimed is:

1. A path switching method based on user text information, comprising:
after a target base station receives a resume request message sent by a user equipment (UE), sending, by the target base station, a user text obtain request message to a source base station directly or through a mobility management entity (MME), wherein the user text obtain request message carries a user text resume identifier (ID), and at least one of a user text ID or an MME ID;
receiving, by the target base station, a user text obtain response message sent by the source base station, wherein the user text obtain response message carries user text information found by the source base station according to information carried in the user text obtain request message; and
sending, by the target base station, a path switch request message for requesting user text resume to the MME; and after the user text information is activated by the MME according to the path switch request message for requesting user text resume, receiving, by the target base station, a path request response message sent by the MME, to complete the user text resume.

2. The path switching method based on user text information of claim 1, wherein
the user text ID comprises an ID that uniquely identifies a user text at the MME; and
the MME ID comprises an ID of a source MME serving the UE.

3. The path switching method based on user text information of claim 1, wherein sending, by the target base station, the user text obtain request message to the source base station directly or through the MME comprises:

sending, by the target base station, the user text obtain request message to the source base station through the MME via an S1 interface, or sending the user text obtain request message to the source base station directly via an X2 interface.

4. The path switching method based on user text information of claim 1, wherein receiving, by the target base station, the user text obtain response message sent by the source base station comprises:
receiving, by the target base station, through the MME via an S1 interface, the user text obtain response message sent by the source base station, or receiving, directly via an X2 interface, the user text obtain response message sent by the source base station.

5. The path switching method based on user text information of claim 4, wherein receiving, by the target base station, through the MME via the S1 interface, the user text obtain response message sent by the source base station comprises:
when no X2 interface exists between the target base station and the source base station, matching, by the target base station, a route to the source base station based on the user text information of a core network; and
receiving, by the target base station, via the route to the source base station, the user text information sent by the source base station through the MME.

6. A path switching method based on user text information, comprising:
receiving, by a target radio access network (RAN) node, a resume request message sent by a user equipment (UE), and sending a user text obtain request message to a source RAN node;
receiving, by the target RAN node, a user text obtain response message sent by the source RAN node, wherein the user text obtain response message carries user text information on the source RAN node; and
after a data transmission channel is established between the source RAN node and the target RAN node according to information carried in the user text obtain request message, receiving, by the target RAN node, data cached locally and forwarded by the source RAN node,
wherein the user text obtain request message comprises: a user text resume identifier (ID), and at least one of relevant information about the source RAN node or data forwarding address information of the target RAN node.

7. The path switching method based on user text information of claim 6, wherein sending, by the target RAN node, the user text obtain request message to the source RAN node comprises:
sending, by the target RAN node, the user text obtain request message to the source RAN node via a direct interface to the source RAN node.

8. The path switching method based on user text information of claim 7, wherein sending, by the target RAN node, the user text obtain request message to the source RAN node further comprises:
when no direct interface exists between the target RAN node and the source RAN node, matching a route to the source RAN node based on user text information found by a core network.

9. The path switching method based on user text information of claim 6, wherein receiving, by the target RAN node, the resume request message sent by the UE comprises:
when the UE is switched into an inactive state on the source RAN node and is paged successfully, receiving, by the target RAN node, the resume request message sent by the UE.

10. The path switching method based on user text information of claim 9, wherein when the UE is switched into the inactive state, the UE is still in a connected state for a core network.

11. The path switching method based on user text information of claim 9, wherein the paging of the UE comprises: initiating, by the source RAN node, the paging of the UE within a location area of the source RAN node.

12. The path switching method based on user text information of claim 6, wherein the resume request message comprises at least one of:
a user text resume identifier (ID), which is used for uniquely identifying user text information in the source RAN node;
a user text ID, which is used for uniquely identifying a user text in a core network; or
an ID of a source core network node serving the UE, which is used for obtaining the user text across core network nodes.

13. The path switching method based on user text information of claim 6, wherein the data forwarding address information comprises: address information related to a bearer, or address information related to an Internet Protocol (IP) flow; and
wherein after a data transmission channel is established between the source RAN node and the target RAN node according to information carried in the user text obtain request message, receiving, by the target RAN node, data cached locally and forwarded by the source RAN node comprises:
after the data transmission channel is established between the source RAN node and the target RAN node according to the data forwarding address information of the target RAN node, receiving, by the target RAN node, the data cached locally and forwarded by the source RAN node.

14. A path switching apparatus based on user text information, comprising:
a processor; and
a memory for storing instructions executable by the processor,
wherein the processor is configured to:
receive a resume request message sent by a user equipment (UE);
send a user text obtain request message to a source base station directly or through a mobility management entity (MME), wherein the user text obtain request message carries: a user text resume identifier (ID), and at least one of a user text ID or an MME ID;
receive a user text obtain response message sent by the source base station, wherein the user text obtain response message carries user text information found by the source base station according to information carried in the user text obtain request message;
send a path switch request message for requesting user text resume to the MME; and
receive a path request response message sent by the MME to complete the user text resume after the user text information is activated by the MME according to the path switch request message for requesting user text resume.

15. The path switching apparatus based on user text information of claim 14, wherein the processor is configured to send the user text obtain request message to the source base station through the MME via an S1 interface, or send the user text obtain request message to the source base station directly via an X2 interface.

16. The path switching apparatus based on user text information of claim 14, wherein
the processor is configured to receive, through the MME via an S1 interface, the user text obtain response message sent by the source base station, or receive, directly via an X2 interface, the user text obtain response message sent by the source base station.

17. A path switching apparatus based on user text information, comprising:
a processor; and
a memory for storing instructions executable by the processor,
wherein the processor is configured to implement the path switching method based on user text information of claim 6.

18. The path switching apparatus based on user text information of claim 17, wherein the processor is configured to send the user text obtain request message to the source RAN node via a direct interface to the source RAN node.

19. The path switching apparatus based on user text information of claim 18, wherein the processor is further configured to match a route to the source RAN node based on user text information found by a core network when no direct interface exists between the target RAN node and the source RAN node.

* * * * *